(12) United States Patent
Moriguchi et al.

(10) Patent No.: US 11,073,740 B2
(45) Date of Patent: Jul. 27, 2021

(54) TERAHERTZ WAVE GENERATION METHOD AND TERAHERTZ WAVE GENERATION DEVICE

(71) Applicants: TOPCON CORPORATION, Tokyo (JP); RIKEN, Saitama (JP)

(72) Inventors: Yoshikiyo Moriguchi, Itabashi-ku (JP); Hiroaki Minamide, Wako (JP)

(73) Assignees: TOPCON CORPORATION, Tokyo (JP); RIKEN, Saitama (JP)

( * ) Notice: Subject to any disclaimer, the term of this patent is extended or adjusted under 35 U.S.C. 154(b) by 0 days.

(21) Appl. No.: 16/637,774

(22) PCT Filed: Jul. 30, 2018

(86) PCT No.: PCT/JP2018/028453
§ 371 (c)(1),
(2) Date: Feb. 10, 2020

(87) PCT Pub. No.: WO2019/031289
PCT Pub. Date: Feb. 14, 2019

(65) Prior Publication Data
US 2020/0183251 A1    Jun. 11, 2020

(30) Foreign Application Priority Data

Aug. 10, 2017 (JP) .............................. JP2017-155165

(51) Int. Cl.
*G02F 2/00* (2006.01)
*G02F 1/35* (2006.01)
(Continued)

(52) U.S. Cl.
CPC ............ *G02F 2/002* (2013.01); *G02F 1/3534* (2013.01); *G02F 1/39* (2013.01); *H01S 3/10* (2013.01); *G02F 2203/13* (2013.01)

(58) Field of Classification Search
CPC .......... G02F 1/3534; G02F 1/39; G02F 2/002; H01S 3/10; G21K 5/00; G21K 5/02
See application file for complete search history.

(56) References Cited

U.S. PATENT DOCUMENTS 6,344,921 B1 *  2/2002  Galvanauskas ......... G02F 1/395
                                                            359/328
6,697,186 B2 *  2/2004  Kawase .................... G02F 1/39
                                                            359/326

(Continued)

FOREIGN PATENT DOCUMENTS

WO    2015/008809 A1    1/2015
WO    2016/139754 A1    9/2016

OTHER PUBLICATIONS

Hayashi et al, "High-Power Single-Longitudinal-Mode Terahertz Wave Generation Pumped by a Microchip Nd:YAG Laser", Optics Express vol. 20, No. 3, 2881-2886, 2012). (Year: 2012).*

(Continued)

*Primary Examiner* — David E Smith
(74) *Attorney, Agent, or Firm* — Xsensus LLP (57) ABSTRACT

A terahertz-wave generation method of generating a terahertz wave in a direction satisfying a non-collinear phase-matching condition by making pump light incident on a nonlinear optical crystal capable of generating a terahertz wave by optical parametric effect, makes the pump light incident on the nonlinear optical crystal so that a peak excited power density is equal to or greater than a predetermined terahertz-wave lasing threshold and equal to or less than a predetermined laser damage threshold, and an average excited power density, is equal to or less than a predetermined photorefractive effect occurrence threshold, the pump light having a pulse width of 10 ps or more, the pulse width of 1 ns or less, and a repetition frequency of 1 kHz or more.

22 Claims, 5 Drawing Sheets

(51) Int. Cl.
  *G02F 1/39* (2006.01)
  *H01S 3/10* (2006.01)

(56) References Cited

U.S. PATENT DOCUMENTS

| | | | |
|---|---|---|---|
| 7,272,158 B1* | 9/2007 | Hayes | G02F 1/365 |
| | | | 372/21 |
| 9,804,476 B2* | 10/2017 | Luther-Davies | G02F 1/39 |
| 2009/0261767 A1* | 10/2009 | Butler | G05D 23/1917 |
| | | | 318/445 |
| 2009/0274181 A1* | 11/2009 | Akahane | H01S 3/2308 |
| | | | 372/25 |
| 2009/0303574 A1* | 12/2009 | Gunter | H01S 1/02 |
| | | | 359/328 |
| 2010/0290487 A1* | 11/2010 | Wu | H01S 1/02 |
| | | | 372/21 |
| 2011/0032601 A1* | 2/2011 | Kondo | G02F 1/39 |
| | | | 359/330 |
| 2016/0377958 A1* | 12/2016 | Ouchi | G02F 1/37 |
| | | | 250/353 |
| 2018/0031469 A1* | 2/2018 | Aiko | G02F 1/03 |
| 2018/0373119 A1* | 12/2018 | Hebling | G02F 1/3534 |

OTHER PUBLICATIONS

Wu et al, "Terahertz Parametric Generation and Amplification from Potassium Titanyl Phosphate in Comparison With Lithium Niobate and Lithium Tantalate", Optics Express vol. 24, No. 23, 2016 (Year: 2016).*

Xu et al, "Record-High Powers for Narrowband Backward Terahertz Generation from Periodically-Poled Lithium Niobate", 2009 Optical Society of America OSA/CLEO/IQEC, CMPP4.pdf (Year: 2009).*

Hayashi et al., "Ultrabright Continuously Tunable Terahertz-Wave Generation at Room Temperature", Scientific Reports 4:5045 DOI:10.1038/srep05045, 2014 (Year: 2014).*

Takida et al, "Frequency-Domain Spectroscopy Using High-Power Tunable THz-Wave Sources:Towards THz Sensing and Detector Sensitivity Calibration", Proc of Spie vol. 10210, 102100W-1, 2017 (Year: 2017).*

Matsukawa et al, "Pump-Beam-Induced Optical Damage Depended on Repetition Frequency and Pulse Width in 4-Dimethylamino-N-methyl-4-Stilbazolium Tosylate Crystal", Applied Physics Letters 103, 0233202, 2013 (Year: 2013).*

International Search Report and Written Opinion dated Aug. 8, 2018, 2018 for PCT/JP2018/028453 filed on Jul. 30, 2018, 9 pages including English Translation of the International Search Report.

Hayashi, S., et al., "Ultrabright continuously tunable terahertz-wave generation at room temperature," Article in Scientific Reports, vol. 4, Article No. 5045, Jun. 5, 2014, pp. 1-5.

Matsukawa, T., et al., "Pump-beam-induced 1-22 optical damage depended on repetition frequency and pulse width in 4-dimethylamino-N'-methyl-4'-stilbazolium tosylate crystal," Applied Physics Letters, vol. 103, No. 2, Jul. 2013, pp. 023302-1 to 023302-4.

Wu, MH., et al., "Terahertz parametric generation and amplification from potassium titanyl phosphate in comparison with lithium niobite and lithium tantalite," Optics Express, vol. 24, No. 23, pp. Nov. 14, 2016, pp. 25964-25973.

Yuma, T., and Minamide, H., "Frequency-domain spectroscopy using high-power tunable THz-wave sources: towards THz sensing and detector sensitivity calibration," Proceedings of SPIE, vol. 10210, May 5, 2017, pp. 102100W-1 to 102100W-6.

Extended European search report dated Apr. 7, 2021, in corresponding European patent Application No. 18843606.7, 10 pages.

Daniel Creeden et al., "Compact, high average power, fiber-pumped terahertz source for active real-time imaging of concealed objects", Optics Express, vol. 15, No. 10, May 14, 2007, pp. 6478-6483.

* cited by examiner

TERAHERTZ WAVE GENERATION METHOD AND TERAHERTZ WAVE GENERATION DEVICE

CROSS-REFERENCE TO RELATED APPLICATIONS

This application is a national stage (under 35 U.S.C. 371) of International Patent Application No. PCT/JP2018/028453, filed Jul. 30, 2018, claiming priority to Japanese Patent Application No. 2017-155165, filed Aug. 10, 2017, both of which are herein incorporated by reference in their entirety.

FIELD

The disclosure relates to a terahertz-wave generation method and a terahertz-wave generation apparatus.

BACKGROUND

The terahertz wave region (far-infrared region) is a frequency region located at the contact point between light waves and radio waves, and is a region located at the boundary between optics and electronics. Such a terahertz wave region has both straight-ahead property like light waves and material permeability like radio waves, and is expected to be applied to imaging and spectroscopic measurement. However, the terahertz wave region is an undeveloped region on a technological aspect and an application aspect, unlike the light wave band and the radio wave band. Therefore, the development of breakthrough devices (killer devices) in light sources and detectors is strongly desired. In particular, the frequency region of 0.3 THz to 5 THz is called a terahertz gap.

In recent years, a high-intensity terahertz-wave light source using optical rectification has been developed and attracts attention. This terahertz-wave light source generates a terahertz wave having a high peak intensity in a broadband by high intensity excitation of the surface of the nonlinear optical crystal ($LiNbO_3$) by tilting the wavefront of the femtosecond laser.

On the other hand, there are many needs for a terahertz-wave light source of a narrow linewidth (narrow band). The terahertz wave region is a region corresponding to an energy level such as a phonon mode of crystal, a low-frequency vibration mode of molecular, and a rotation mode of gas. For example, in the atmospheric absorption spectrum in the terahertz wave region, it is known that there are many absorption lines (loss) due to low molecular weight gas molecules in the air, particularly water vapor. Therefore, in measurement in atmospheric environment, it is desirable to use the terahertz-wave light source having a narrow linewidth and to select a frequency so as to avoid the absorption lines. In addition, when a target molecular species is specified by terahertz spectroscopic measurement, it is effective to use a light source having a linewidth equal to or less than the absorption linewidth.

Against a background of the needs described above, in recent years, a terahertz-wave light source of injection-seeded Terahertz Parametric Generation (hereinafter is-TPG) method has been developed and attracts attention (for example, see Japanese Unexamined Patent Publication No. 2002-72269).

When pump light (excitation light) is incident on a nonlinear optical crystal having Raman activity and far-infrared activity, idler light and a terahertz wave are generated via elementary excitation waves (polaritons) of the substance by the stimulated Raman effect (or parametric interaction).

When the pump light alone is injected into the nonlinear optical crystal, the idler light and the terahertz wave are generated as spontaneous emission light generated from parametric noise. Thereby, the spectrum linewidth becomes wide and the terahertz wave is very week.

Therefore, a method of narrowing the spectrum by gain concentration to generate a terahertz wave with a high monochromaticity (<4 GHz) is known (for example, see Japanese Patent No. 3747319 Specification). In this method, the terahertz wave is generated by injecting seed light with a narrow linewidth into the terahertz wave generated by the optical parametric effect. Using such seed light, an ultrashort pulse light source such as a femtosecond laser becomes unnecessary. As a result, the apparatus can be produced with compact size and the cost of the apparatus can be reduced.

In a terahertz-wave light source using is-TPG, a method of generating coherent terahertz waves with high peak efficiency and high conversion efficiency (up to $10^4$) at room temperature by exciting the nonlinear optical crystal with high intensity with excitation light has been proposed (for example, see "Ultrabright continually tunable terahertz-wave generation at room temperature" (S. Hayashi, K. Nawata, T. Taira, J. Shikata, K. Kawase, and H. Minamide, Scientific Reports, published Jun. 5, 2014, Vol. 4, pp. 5045)). In this method, the nonlinear optical crystal is excited using a sub-nanosecond microchip laser with a repetition frequency of 100 Hz or less and a high peak intensity (peak value) as an excitation light source. Using sub-nanosecond excitation light, the contribution of stimulated Brillouin scattering, which competes with stimulated Raman scattering for gain, is suppressed, and high conversion efficiency is realized.

Further, in a terahertz-wave light source using is-TPG, a method of generating terahertz waves in a wide band (0.4 THz to 4.7 THz) has been proposed (for example, see "Frequency-domain spectroscopy using high-power tunable THz-wave sources: towards THz sensing and detector sensitivity calibration" (Y. Takida and H. Minamide, Proc of SPIE, vol. 10210, 102100 W-1 to 102100 W-6)).

SUMMARY

In the conventional technique, the repetition frequency that can be generated is limited to 100 Hz or less, and there is a problem that the applicable application range is limited.

In order to generate a terahertz wave having a high repetition frequency, it is necessary to excite a nonlinear optical crystal having a high (effective) nonlinear susceptibility with a high intensity laser having a high repetition frequency. Although, optical damage of the crystal often becomes a problem under high-intensity excitation conditions using pump light having a high repetition frequency.

According to some embodiments of the present invention, a terahertz-wave generation method and a terahertz-wave generation apparatus capable of generating a terahertz wave having a high repetition frequency and high monochromaticity at room temperature while avoiding optical damage of the nonlinear optical crystal can be provided.

One aspect of the embodiments is a terahertz-wave generation method of generating a terahertz wave in a direction satisfying a non-collinear phase-matching condition by making pump light incident on a nonlinear optical crystal capable of generating a terahertz wave by optical parametric effect, the method including: making the pump light incident on the nonlinear optical crystal so that a peak excited power density is equal to or greater than a predetermined terahertz-wave lasing threshold and equal to or less than a predetermined laser damage threshold, and an average excited power density is equal to or less than a predetermined photorefractive effect occurrence threshold, the pump light having a pulse width of 10 ps or more, the pulse width of 1 ns or less, and a repetition frequency of 1 kHz or more.

Another aspect of the embodiments is a terahertz-wave generation apparatus, including: a pump light source configured to output pump light having a pulse width of 10 ps or more, the pulse width of 1 ns or less, and a repetition frequency of 1 kHz or more; a nonlinear optical crystal capable of generating a terahertz wave by optical parametric effect; a first optical system configured to guide the pump light output by the pump light source to the nonlinear optical crystal; and a controller configured to control at least one of the pump light source and the first optical system so that a peak excited power density is equal to or greater than a predetermined terahertz-wave lasing threshold and equal to or less than a predetermined laser damage threshold, and an average excited power density is equal to or less than a predetermined photorefractive effect occurrence threshold, wherein the terahertz-wave generation apparatus is configured to generate the terahertz wave in a direction satisfying a non-collinear phase-matching condition by making the pump light incident on the nonlinear optical crystal.

DETAILED DESCRIPTION

An example of embodiments of a terahertz-wave generation method and a terahertz-wave generation apparatus according to the present invention will be described in detail with reference to the drawings. The terahertz-wave generation method according to the present invention generates a terahertz wave in a direction satisfying a non-collinear phase-matching condition by making pump light incident on a nonlinear optical crystal capable of generating a terahertz wave by optical parametric effect. Hereinafter, a terahertz-wave generating apparatus that implements the terahertz-wave generating method will be mainly described. In the following, for convenience of description, the excitation light is referred to as pump light.

Configuration Example of Optical System

Figure 1:
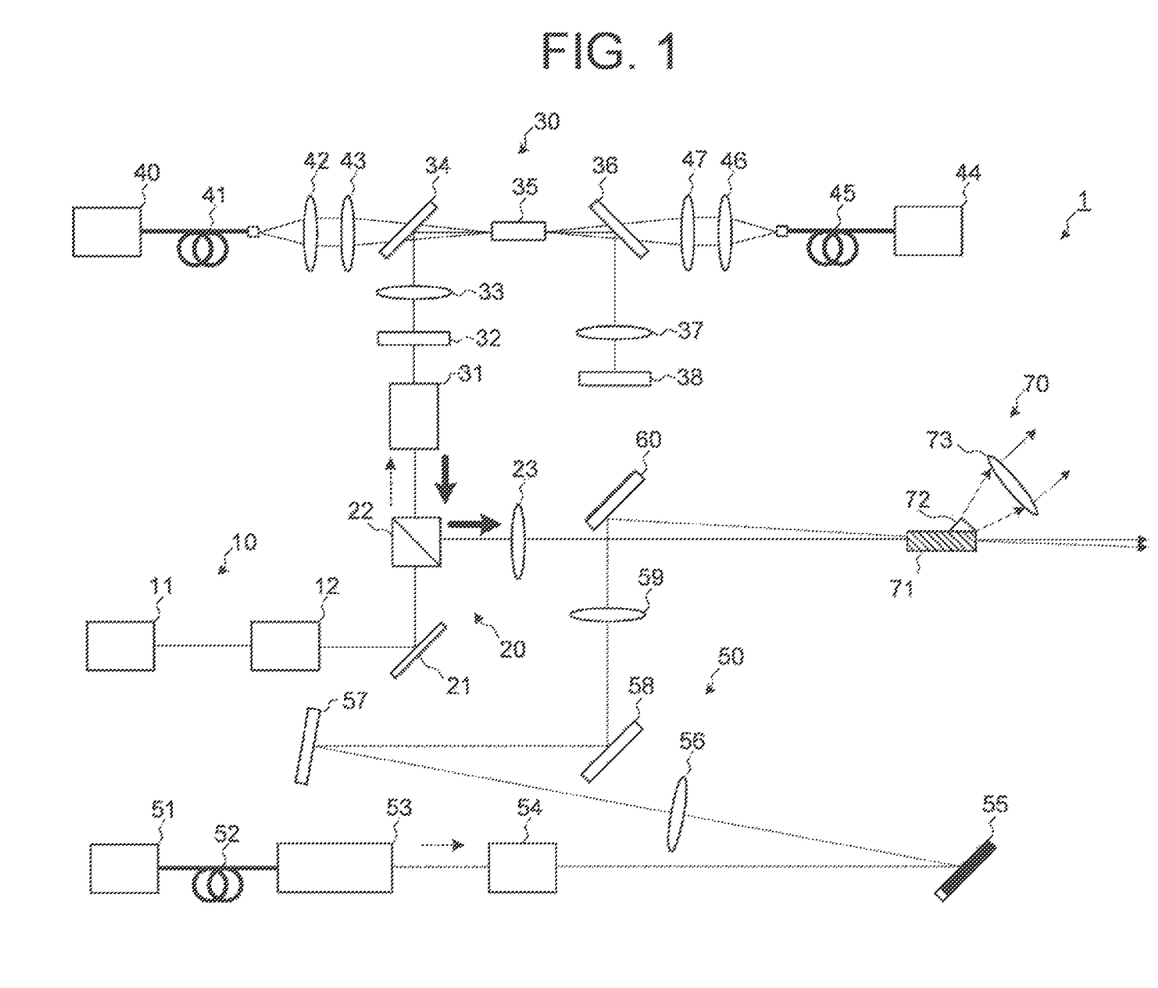
FIG. 1 is a schematic diagram illustrating an example of the configuration of an optical system of a terahertz-wave generation apparatus according to embodiments.

FIG. 1 shows a configuration example of an optical system of a terahertz-wave generation apparatus according to embodiments. The terahertz-wave generation apparatus 1 according to the embodiments can generate a terahertz wave in a direction satisfying a non-collinear phase-matching condition by making pump light incident on a nonlinear optical crystal capable of generating a terahertz wave by optical parametric effect.

The terahertz-wave generation apparatus 1 includes a pump light generation system 10, a pump light guide system 20, a pump light amplification system 30, a seed light generation system 50, and a terahertz-wave generation system 70.

(Pump Light Generation System 10)

The pump light generation system 10 generates pump light incident on a nonlinear optical crystal 71 described later. The pump light generation system 10 includes a pump light source 11 and an isolator 12.

Figure 2:
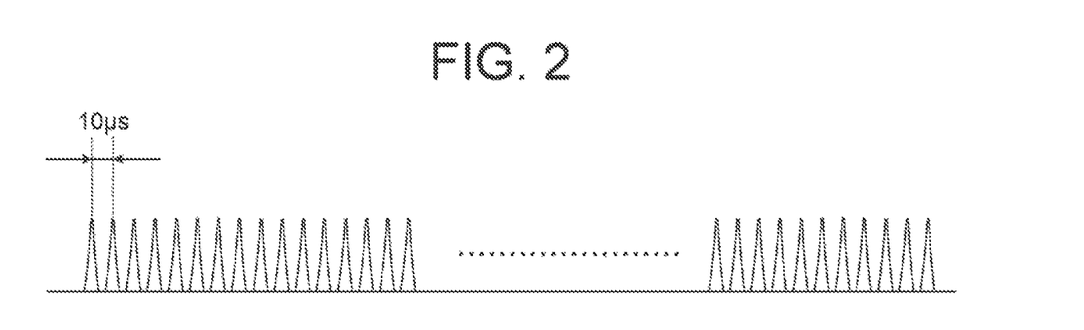
FIG. 2 is a schematic diagram for explaining an operation of the terahertz-wave generation apparatus according to the embodiments.

The pump light source 11 outputs the pump light. As the pump light source 11, for example, a passively Q-switched type microchip laser provided with a semiconductor saturable absorber mirror (SESAM) is used. This microchip laser outputs the pump light (for example, 5 mW) having a repetition frequency of 100 kHz as shown in FIG. 2, a center wavelength of 1064 nm, and a pulse width of 140 ps.

The pump light source 11 only needs to output the pump light having a pulse width of 10 ps or more, the pulse width of 1 ns or less, and a repetition frequency of 1 kHz or more. It should be noted that the pump light source 11 may be a light source capable of changing at least one of output power, repetition frequency, center wavelength, and pulse width.

The isolator 12 blocks returning light, that travels to the pump light source 11, of the output pump light.

(Pump Light Guide System 20)

The pump light guide system 20 guides the pump light output from the pump light generation system 10 to the nonlinear optical crystal 71. At this time, the pump light guide system 20 guides the pump light output from the pump light generation system 10 to the pump light amplification system 30, and guides the pump light amplified by this pump light amplification system 30 to the nonlinear optical crystal 71. The pump light guide system 20 includes a reflective mirror 21, a polarizing beam splitter 22, and a lens system 23.

The reflective mirror 21 reflects the pump light output from the pump light generation system 10, and guides the pump light to the polarizing beam splitter 22.

The polarizing beam splitter 22 transmits a first polarization component (for example, vertical polarization component) of the pump light output from the pump light generation system 10 and guides it to the pump light amplification system 30. And, the polarizing beam splitter 22 reflects a second polarizing component (for example, horizontal polarization component) of the pump light amplified by the pump light amplification system 30 and guides it to the lens system 23.

The lens system 23 includes one or more lenses, and is capable of changing a focal position of the incident light. The lens system 23 may include at least one lens capable of moving in the optical axis direction. In this case, the lens system 23 can include a movement mechanism for moving the lens in an optical axis direction, and can change the focal position by moving the lens in the optical axis direction using the movement mechanism under the control of the controller 100 described later.

Alternatively, the lens system 23 may include a variable focusing lens. In this case, the variable focusing lens can change the focal position under the control of the controller 100 described later.

Alternatively, a relative position of the nonlinear optical crystal 71 with respect to the lens system 23 may be changable. In this case, a movement mechanism for moving at least one of the lens system 23 and the nonlinear optical crystal 71 in the optical axis direction can be provided, and the relative position of the nonlinear optical crystal 71 with respect to the lens system 23 can be changed by moving at least one of the lens system 23 and the nonlinear optical crystal 71 in the optical axis direction using the movement mechanism under the control of the controller 100 described later. Thereby, the focal position of the lens system 23 inside the nonlinear optical crystal 71 is changed.

(Pump Light Amplification System 30)

The pump light amplification system 30 amplifies the pump light transmitted through the polarizing beam splitter 22. The pump light amplification system 30 includes a double-pass type dual-end-pumped optical amplifier.

The pump light amplification system 30 includes a Faraday rotator 31, a half-wave plate 32, a relay lens 33, a dichroic mirror 34, a laser crystal 35, a dichroic mirror 36, a relay lens 37, and a reflective mirror 38. The pump light amplification system 30 may include the polarizing beam splitter 22. The laser crystal 35 may be a neodymium: yttrium vanadium tetroxide (Nd; $YVO_4$) crystal.

The relay lens 37 can change a focal position of the incident light. For example, the pump light amplification system 30 can include a movement mechanism for moving the relay lens 37 in an optical axis direction, and can change the focal position by moving the relay lens 37 in the optical axis direction using the movement mechanism under the control of the controller 100 described later. Alternatively, the relay lens 37 may be a variable focusing lens. In this case, the variable focusing lens can change the focal position under the control of the controller 100 described later.

In addition, the pump light amplification system 30 includes a first laser diode 40, an optical fiber 41, a collimator lens 42, a condenser lens 43, a second laser diode 44, an optical fiber 45, a collimator lens 46, and a condenser lens 47.

Each of the first laser diode 40 and the second laser diode 44 outputs a pump laser having a central wavelength of 808 nm by CW (Continuous Wave) oscillation. The output power of the first laser diode 40 and the output power of the second laser diode 44 may not be the same. The dichroic mirrors 34 and 36 have characteristics of transmitting light with 808 nm and reflecting light with 1064 nm.

The plane of polarization of the pump light transmitting through the polarizing beam splitter 22 is rotated by the Faraday rotator 31 and the half-wave plate 32. The pump light whose plane of the polarization is rotated passes through the relay lens 33, is reflected by the dichroic mirror 34, and enters a first end face of the laser crystal 35. The pump light incident on the first end face of the laser crystal 35 is emitted from a second end face, which faces the first end face, of the laser crystal 35, is reflected by the dichroic mirror 36, passes through the relay lens 37, and is reflected by the reflective mirror 38. The pump light reflected by the reflective mirror 38 travels in the opposite direction on the same path, enters the second end face of the laser crystal 35, is emitted from the first end face, and is guided to the polarizing beam splitter 22.

Pump laser emitted from the first laser diode 40 is guided through the optical fiber 41, and is emitted from an end of the optical fiber 41. The pump laser emitted from the end of the optical fiber 41 is collimated by the collimator lens 42 and enters the first end face of the laser crystal 35 by the condenser lens 43 via the dichroic mirror 34. The first end face is an end face on which the pump light reflected by the dichroic mirror 34 is incident. Thereby, the pump laser from the first laser diode 40 is focused on the first end face of the laser crystal 35 or the focal position inside thereof.

In the same way, pump laser emitted from the second laser diode 44 is guided through the optical fiber 45, and is emitted from an end of the optical fiber 45. The pump laser emitted from the end of the optical fiber 45 is collimated by the collimator lens 46 and enters the second end face of the laser crystal 35 by the condenser lens 47 via the dichroic mirror 36. The second end face is an end face which faces the first end face, and is an end face on which the pump light reflected by the dichroic mirror 36 is incident. Thereby, the pump laser from the second laser diode 44 is focused on the second end face of the laser crystal 35 or the focal position inside thereof.

The pump light guided to the polarizing beam splitter 22 via the laser crystal 35 in the pump light amplification system 30 is amplified by traveling back and forth inside the laser crystal 35 (for example, the average power is 4.4 W). The plane of polarization of the pump light guided to the polarizing beam splitter 22 is rotated by the half-wave plate 32 and the Faraday rotator 31. Therefore, the polarization direction of the pump light is orthogonal to the polarization direction of the pump light before amplification. The pump light guided to the polarizing beam splitter 22 is reflected by the polarizing beam splitter 22, passes through the lens system 23, and enters an end face of the nonlinear optical crystal 61.

(Seed Light Generation System 50)

The seed light generation system 50 optically injects seed light having a narrow linewidth into the terahertz wave generated by the optical parametric effect in the nonlinear optical crystal 71. The seed light generation system 50 includes a seed light source 51, an optical fiber 52, an optical amplifier 53, an isolator 54, a diffraction grating 55, a relay lens 56, a reflective mirror 57, a reflective mirror 58, a relay lens 59, and a reflective mirror 60.

The seed light source 51 outputs seed light having a variable center wavelength in the range of 1068 nm to 1075 nm by CW (Continuous Wave) oscillation, for example. The seed light output from the seed light source 51 is guided to the optical amplifier 53 through the optical fiber 52.

The optical amplifier 53 amplifies the seed light output from the seed light source 51. As the optical amplifier 53, for example, an optical amplifier using an ytterbium (Yb)-doped fiber as a gain medium (Ytterbium Doped Fiber Amplifier: YDFA) is used. The amplification factor of the seed light by the optical amplifier 53 may be variable.

The isolator 54 blocks returning light, that travels to the optical amplifier 53 and the seed light source 51, of the amplified seed light.

A diffraction plane of the diffraction grating 55 is arranged at a position optically substantially conjugate with an incident end face of the pump light in the nonlinear optical crystal 71 (or focal position of the pump light inside the nonlinear optical crystal 61). The ratio of the focal length of the relay lens 56 and the focal length of the relay lens 59 is 3:1. One focal position of the relay lens 56 is disposed on or near the diffraction plane of the diffraction grating 55. The other focal position of the relay lens 56 is disposed between the relay lens 56 and the relay lens 59. One focal position of the relay lens 59 is disposed on or near the focal position of the relay lens 56. The other focal position of the relay lens 59 is arranged at the incident end face of the pump light in the nonlinear optical crystal 71 (or focal position of the pump light inside the nonlinear optical crystal 61) or in the vicinity thereof. The seed light generated by the seed light generation system 50 is injected into the nonlinear optical crystal 71 in the generation direction of idler light.

Such a configuration is a configuration that substantially realizes achromatic phase matching (for example, see Patent Document 2). That is, using the diffraction grating 55 and an confocal optical system constituted by the relay lens 56 and the relay lens 59, the incident angle of the seed light on the nonlinear optical crystal 71 substantially matches a desired non-collinear phase-matching condition regardless of the wavelength. Therefore, the optical axis need not to be adjusted every time the wavelength of the seed light is changed. Thereby, a terahertz wave with high monochromaticity (<4 GHz) can be generated by narrowing the spectrum by gain concentration using the seed light having a narrow linewidth.

(Terahertz-Wave Generation System 70)

The terahertz-wave generation system 70 generates the terahertz wave using the optical parametric effect. The terahertz-wave generation system 70 includes the nonlinear optical crystal 71, a silicon prism 72, and a collimator lens 73.

The nonlinear optical crystal 71 can generate a terahertz wave by the optical parametric effect. As the nonlinear optical crystal 71, lithium niobate (LiNbO$_3$) with stoichiometric composition or lithium niobate with congruent composition is used. In the embodiments, the lithium niobate with stoichiometric composition includes lithium niobate to which impurities such as magnesium (Mg) are added at a very low concentration. For example, the molal fraction of Li$_2$O/(Nb$_2$O$_5$+Li$_2$O) of the lithium niobate with stoichiometric composition may be 0.490 or more and less than 0.500. The lithium niobate with congruent composition includes lithium niobate to which impurities such as magnesium (Mg) or magnesium oxide (MgO) are added.

Alternatively, as the nonlinear optical crystal 71, magnesium doped tantalate lithium (LiTaO$_3$) crystal, potassium phosphate titanate (KTiOPO$_4$, KTP) crystal, potassium titanyl arsenate (KTiOAsO$_4$, KTA) crystal, gallium arsenide (GaAs) crystal, indium antimonide (InSb) crystal, gallium phosphide (GaP) crystal, zinc selenide (ZnSe) crystal, zinc telluride (ZnTe) crystal, or the like may be used. Hereinafter, as the nonlinear optical crystal 71 according to the embodiments, lithium niobate with congruent composition to which magnesium oxide (MgO) is added at 5 mol % is used.

The silicon prism 72 is a prism for extracting the terahertz wave generated by the optical parametric effect to the outside of the nonlinear optical crystal 71. The collimator lens 73 converts the terahertz wave extracted by the silicon prism 72 into a parallel light flux.

Figure 3:
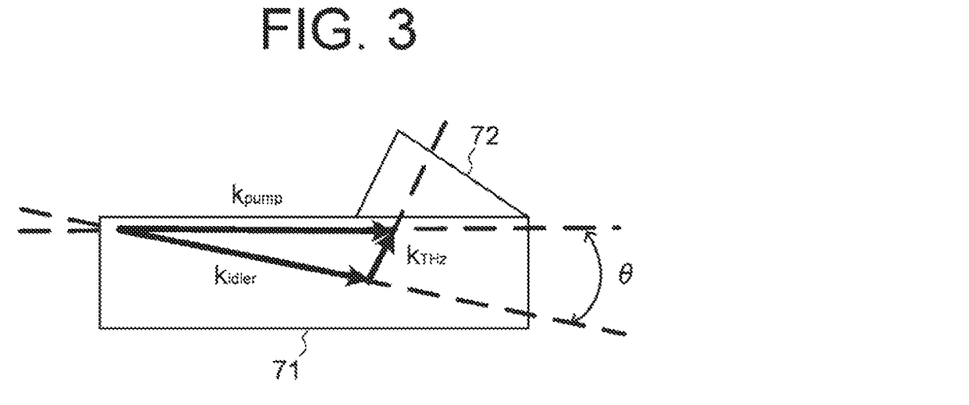
FIG. 3 is a schematic diagram for explaining an operation of the terahertz-wave generation apparatus according to the embodiments.

Such a nonlinear optical crystal 71 has Raman activity and far-infrared activity. When the pump light is incident on the nonlinear optical crystal 71, the idler light and the terahertz waves are generated via elementary excitation waves (polaritons) of the substance by the stimulated Raman effect (or parametric interaction). Between the pump light (frequency $\omega_p$, wave number vector $k_p$), the terahertz wave (frequency $\omega_T$, wave number vector $k_T$), and the idler light (frequency $\omega_i$, wave number vector $k_i$), the energy conservation law shown in Equation (1) and the momentum conservation law (phase matching condition) shown in Equation (2) are established. It should be noted that Equation (2) is a vector equation, and the non-collinear phase-matching condition can be expressed as shown in FIG. 3.

$$\omega_p = \omega_r + \omega_i \quad (1)$$

$$k_p = k_T + k_i \quad (2)$$

The idler light and the terahertz waves have a spatial spread, and their wavelengths change continuously according to the emission angle. Generation of such broad idler light and terahertz waves is called TPG (THz-wave Parametric Generation).

It should be noted that the basic optical parametric process is defined by the disappearance of one pump photon and the simultaneous generation of one idler photon and one signal photon. In case that the idler light or the signal light resonates, parametric oscillation occurs when the pump light intensity exceeds a certain threshold. Further, the disappearance of one pump photon and the simultaneous generation of one idler photon and one polariton are stimulated Raman scattering, and are included in parametric interaction in the broad sense.

The pump light guide system 20 and the pump light amplification system 30 are an example of the "first optical system" according to the embodiments. The seed light generation system 50 is an example of the "second optical system" according to the embodiments.

Configuration Example of Control System

Figure 4:
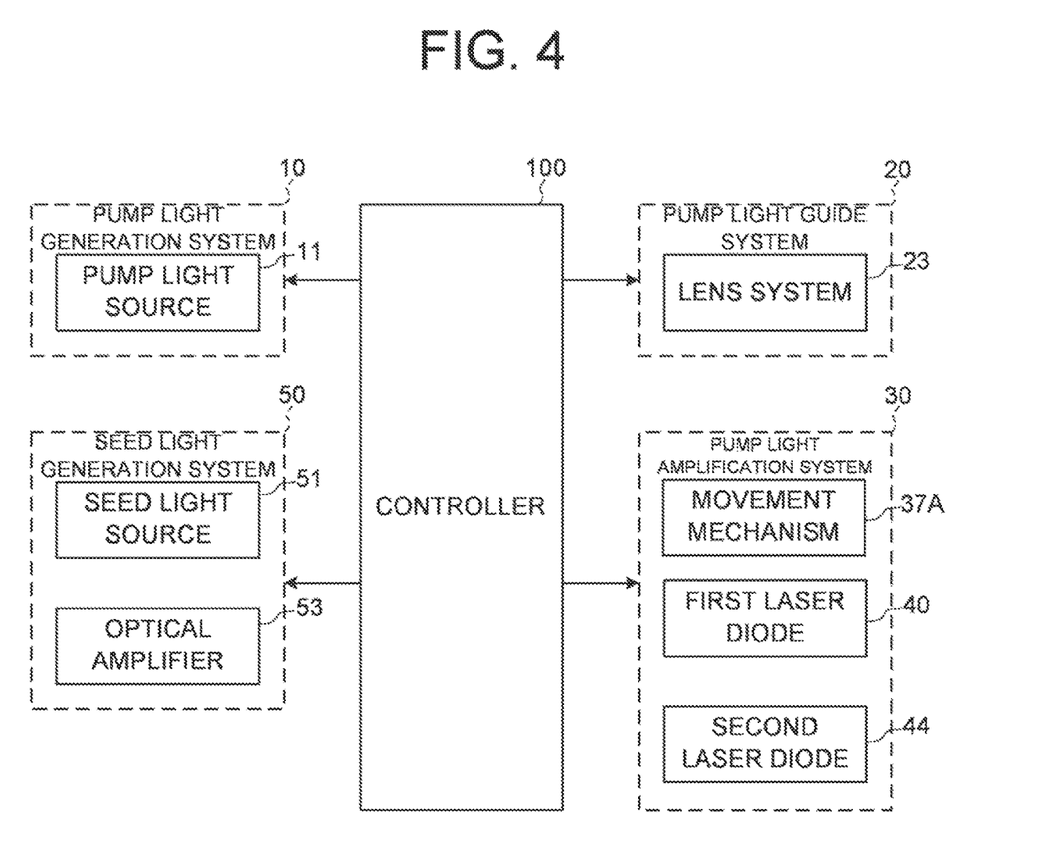
FIG. 4 is a schematic diagram illustrating an example of the configuration of a control system of the terahertz-wave generation apparatus according to the embodiments.

FIG. 4 shows a configuration example of an control system of the terahertz-wave generation apparatus 1 according to the embodiments. In FIG. 4, like reference numerals designate like parts as in FIG. 1. The same description may not be repeated.

The control system of the terahertz-wave generation apparatus 1 is configured with the controller 100 as a center. The controller 100 performs control of each unit of the terahertz-wave generation apparatus 1. In particular, the controller 100 controls the pump light generation system 10, the pump light guide system 20, the pump light amplification system 30, and the seed light generation system 50.

The control for the pump light generation system 10 includes control for changing at least one of the output power, the repetition frequency, the center wavelength, and the pulse width of the pump light. The controller 100 can change at least one of the output power, the repetition frequency, the center wavelength, and the pulse width of the pump light by controlling the pump light source 11.

The control for the pump light guide system 20 includes control for changing a focal position of an incident light of the lens system 23. The controller 100 can change the focal position by controlling the movement mechanism for moving at least one of the lens in the lens system 23 in the optical axis direction. Further, the controller 100 can change the focal position of the lens system 23 by controlling the variable focusing lens included in the lens system 23. Alternatively, the controller 100 may change the relative position between the lens system 23 and the nonlinear optical crystal 71.

The control for the pump light guide system 20 includes control for changing the amplification factor of the pump light. The controller 100 can change the amplification factor of the pump light by controlling at least one of the first laser diode 40 and the second laser diode 44. The controller 100 can change the amplification factor of the pump light by controlling the movement mechanism 37A for moving the relay lens 37 in the optical axis direction. Alternatively, the controller 100 may change the amplification factor of the pump light by changing the focal position of the pump laser injected into the laser crystal 35 by moving at least one of the collimator lens 42 and the condenser lens 43 in the optical axis direction. In the same way, the controller 100 may change the amplification factor of the pump light by changing the focal position of the pump laser injected into the laser crystal 35 by moving at least one of the collimator lens 46 and the condenser lens 47 in the optical axis direction.

The control for the seed light generation system 50 includes control for changing power of the seed light injected into the nonlinear optical crystal 71. The controller 100 can change the power of the seed light injected into the nonlinear optical crystal 71 by controlling the seed light source 51. The controller 100 can change the power of the seed light injected into the nonlinear optical crystal 71 by changing the amplification factor of the optical amplifier 53.

The functions of the control unit 100 as described above may be realized by a processor. The term "processor" as used herein refers to a circuit such as, for example, a central processing unit (CPU), a graphics processing unit (GPU), an application specific integrated circuit (ASIC), and a programmable logic device (PLD). Examples of PLD include a simple programmable logic device (SPLD), a complex programmable logic device (CPLD), and a field programmable gate array (FPGA).

The processor realizes, for example, the functions according to the embodiments by reading out a computer program stored in a storage circuit or a storage device and executing the computer program. At least a part of the storage circuit or the storage apparatus may be included in the processor. Further, at least a part of the storage circuit or the storage apparatus may be provided outside of the processor.

As described above, in order to generate a terahertz wave having a high repetition frequency, it is necessary to excite the nonlinear optical crystal 71 with high intensity using the pump light having a high repetition frequency and high intensity. However, simply changing the repetition frequency and intensity of the pump light may cause optical damage to the nonlinear optical crystal 71.

Therefore, the terahertz-wave generation apparatus 1 according to the embodiments controls the pump light incident on the nonlinear optical crystal 71 by focusing attention on the peak excited power density and the average excited power density of the pump light. Thereby, the optical damage of the nonlinear optical crystal 71 can be avoided reliably.

The peak excited power density is a peak value of the power of the pump light per unit area. The average excited power density is an average value of the power of the pump light per unit area.

The peak excited power density PW and the average excited power density AW are related as shown in the following Equation (3) using the repetition frequency f and the pulse width d of the pump light.

$$PW = AW/(f \times d) \quad (3)$$

The optical damage of the nonlinear optical crystal 71 is roughly classified into non-thermal damage and thermal damage. The non-thermal damage corresponds to laser damage. The thermal damage corresponds to damage due to accumulation of energy that changes over time (or photorefractive damage).

For the non-thermal damage, a damage threshold is determined for each type of nonlinear optical crystal mainly by measurement using a pulse light source having a low repetition frequency. On the other hand, for the thermal damage, a damage threshold is determined for each type of nonlinear optical crystal mainly by measurement using a CW light source. Therefore, in order to avoid the non-thermal damage and the thermal damage of the nonlinear optical crystal, the pump light needs to be incident under excitation conditions that is less than the respective damage threshold. However, under conditions excited by a pulsed light source with a high repetition frequency, it is conceivable that the non-thermal damage mechanism and the thermal damage mechanism compete for the nonlinear optical crystal. Thereby, the measures to avoid optical damage under such conditions have not been clarified so far.

Therefore, in the embodiments, the optical damage threshold is defined using the peak excited power density and the average excited power density, and the optical damage of the nonlinear optical crystal 71 is reliably avoided by controlling the pump light based on these.

In optical wavelength conversion using a nonlinear optical crystal, high-intensity excitation of the nonlinear optical crystal is necessary. The threshold for high-intensity excitation of the nonlinear optical crystal is defined by the peak excited power density as a terahertz-wave lasing threshold.

Therefore, the upper and lower limits of the non-thermal damage threshold can be defined using the peak excited power density. Specifically, in order to avoid the non-thermal damage, the peak excited power density is required to be equal to or greater than a predetermined terahertz-wave lasing threshold and equal to or less than a predetermined laser damage threshold.

On the other hand, photorefractive damage, which is thermal damage to the nonlinear optical crystal, is a change in refractive index due to the photorefractive effect. It is known that the photorefractive damage forms a refractive-index grating inside the nonlinear optical crystal and causes beam fanning/distortion of light transmitted through the crystal in the crystal c-axis direction. Thereby, it causes a decrease in wavelength conversion efficiency.

The mechanism of the photorefractive effect is explained by the following processes (a) to (d) (band transport model).
(a) Photoexcitation to a conductor of the carriers (electrons) of shallow donor level between bands
(b) Diffusion of photoexcited carriers (migration) and capture at deep acceptor level (recombination)
(c) Formation of spatial electric field in crystal
(d) Refractive index modulation of crystal by spatial electric field via electro-optic effect The occurrence threshold of the photorefractive effect is defined by the average excited power density as the photorefractive effect occurrence threshold.

Therefore, the upper limits of the thermal damage threshold can be defined using the average excited power density. Specifically, in order to avoid the thermal damage, the average excited power density is required to be equal to or less than a predetermined photorefractive effect occurrence threshold.

Figure 5:
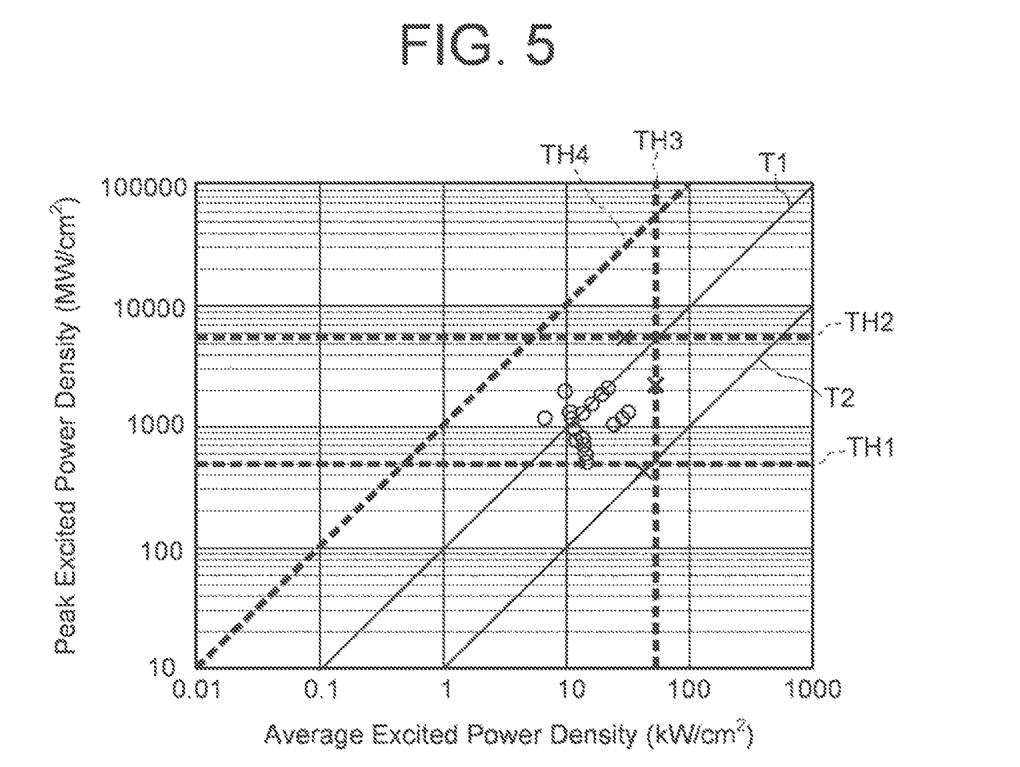
FIG. 5 is a schematic diagram for explaining an control contents of the terahertz-wave generation apparatus according to the embodiments.

FIG. 5 shows a diagram describing of an control content of the pump light in the terahertz-wave generation apparatus 1 according to the embodiments. In FIG. 5, the vertical axis is a logarithmic axis representing the peak excited power density (unit: MW/cm$^2$), and the horizontal axis is a linear axis representing the average excited power density (unit: kW/cm$^2$). FIG. 5 represents the control content of the pump light incident on the lithium niobate with congruent composition to which magnesium oxide (MgO) is added at 5 mol %.

In FIG. 5, "○" indicates an excitation condition in which the generation of the terahertz wave has been confirmed by experiments performed by the present inventors, and "x" indicates an excitation condition in which the generation of the terahertz wave has not been confirmed by experiments performed by the present inventors. In the embodiments, the pulse light having a pulse width of 10 ps or more, the pulse width of 1 ns or less, and a repetition frequency of 1 kHz or more is excited with a threshold value TH4 or less from Equation (3).

As described above, the controller 100 controls the optical system shown in FIG. 1 so that the terahertz-wave lasing is possible and the non-thermal damage and the thermal damage of the nonlinear optical crystal 71 are avoided. Specifically, the controller 100 controls the pump light incident on the nonlinear optical crystal 71 so that the peak excited power density is equal to or greater than a predetermined terahertz-wave lasing threshold TH1 and equal to or less than a predetermined laser damage threshold TH2, and the average excited power density is equal to or less than a predetermined photorefractive effect occurrence threshold TH3.

The terahertz-wave lasing threshold TH1 is desirably 500 MW/cm$^2$ according to the results of experiments performed by the present inventors. The laser damage threshold TH2 is desirably 5.6 GW/cm$^2$ according to the reference (M. H. Wu et al., "Terahertz parametric generation and amplification from potassium titanyl phosphate in comparison with lithium niobate and lithium tantalite", Opt. Express 24, 23 (2016)). The photorefractive effect occurrence threshold TH3 is desirably 53 kW/cm$^2$ according to the results of experiments performed by the present inventors.

Similarly, when the nonlinear optical crystal 71 is lithium niobate crystal with stoichiometric composition, the threshold values are as follows. The terahertz-wave lasing threshold TH1 is desirably 500 MW/cm$^2$ according to the results of experiments performed by the present inventors. The laser damage threshold TH2 is desirably 14 GW/cm$^2$ according to the product specification of the lithium niobate crystal with stoichiometric composition described above published by Oxide Corporation. The photorefractive effect occurrence threshold TH3 is desirably 2 MW/cm$^2$ according to the product specification described above.

In FIG. 5, characteristics T1 represent a characteristic diagram when generation of a terahertz wave is confirmed by pump light having a pulse width of 140 ps and a repetition frequency of 76 kHz. Characteristics T2 represent a characteristic diagram when generation of a terahertz wave is not confirmed by pump light having a pulse width of 1 ns and a repetition frequency of 100 kHz. In the vicinity of the thresholds TH1 to TH3, it is considered that terahertz waves are generated or not generated due to variations in performance of optical elements and measurement conditions.

Control Example

The controller 100 can cause the pump light to enter the nonlinear optical crystal 71 within a range defined by the peak excited power density and the average excited power density shown in FIG. 5 by any one of the following first control to eighth control or combining two or more of the first control to eighth control.

(First Control)

The controller 100 can change the power of the pump light incident on the nonlinear optical crystal 71 by changing the output power of the pump light source 11. Thereby, the excitation conditions defined by the peak excited power density and the average excited power density can be changed. Therefore, the controller 100 can cause the pump light to enter the nonlinear optical crystal 71 within a desired range shown in FIG. 5.

(Second Control)

The controller 100 can change the irradiated area of the pump light incident on the nonlinear optical crystal 71 (light flux diameter of the pump light at an incident surface) by changing the focal position of the lens system 23. Thereby, the excitation conditions defined by the peak excited power density and the average excited power density can be changed. Therefore, the controller 100 can cause the pump light to enter the nonlinear optical crystal 71 within a desired range shown in FIG. 5.

(Third Control)

The controller 100 can change the irradiated area of the pump light incident on the nonlinear optical crystal 71 (light flux diameter of the pump light at an incident surface) by changing the relative position of the nonlinear optical crystal 71 with respect to the lens system 23. When the nonlinear optical crystal 71 moves, it is desirable that the seed light generation system 50 is also configured to be interlocked. Thereby, the excitation conditions defined by the peak excited power density and the average excited power density can be changed. Therefore, the controller 100 can cause the pump light to enter the nonlinear optical crystal 71 within a desired range shown in FIG. 5.

(Fourth Control)

The controller 100 can change the power of the pump light incident on the nonlinear optical crystal 71 by controlling at least one of the first laser diode 40 and the second laser diode 44 to change the amplification factor of the pump light. Thereby, the excitation conditions defined by the peak excited power density and the average excited power density can be changed. Therefore, the controller 100 can cause the pump light to enter the nonlinear optical crystal 71 within a desired range shown in FIG. 5.

(Fifth Control)

The controller 100 can change the power of the pump light incident on the nonlinear optical crystal 71 by changing the aperture of the pump laser incident on the laser crystal 35 or the pump light to change the amplification factor of the pump light. Thereby, the excitation conditions defined by the peak excited power density and the average excited power density can be changed. Therefore, the controller 100 can cause the pump light to enter the nonlinear optical crystal 71 within a desired range shown in FIG. 5.

(Sixth Control)

The controller 100 can change the power of the pump light incident on the nonlinear optical crystal 71 by changing the output power of the seed light source 51 to change the power of the seed light. Thereby, the excitation conditions defined by the peak excited power density and the average excited power density can be changed. Therefore, the controller 100 can cause the pump light to enter the nonlinear optical crystal 71 within a desired range shown in FIG. 5.

(Seventh Control)

The controller 100 can change the power of the pump light incident on the nonlinear optical crystal 71 by changing the amplification factor of the optical amplifier 53 to change the power of the seed light. Thereby, the excitation conditions defined by the peak excited power density and the average excited power density can be changed. Therefore, the controller 100 can cause the pump light to enter the nonlinear optical crystal 71 within a desired range shown in FIG. 5.

(Eighth Control)

The controller 100 can change the power of the pump light incident on the nonlinear optical crystal 71 by changing the f value of the relay lenses 56 and 59 while maintaining the ratio of the focal lengths of each other and changing the power density of the seed light. Thereby, the excitation conditions defined by the peak excited power density and the average excited power density can be changed. Therefore, the controller 100 can cause the pump light to enter the nonlinear optical crystal 71 within a desired range shown in FIG. 5.

Example of Method of Determining Excitation Conditions

When the control range of the pump light is defined as described above, the excitation conditions in the terahertz-wave generation apparatus 1 according to the embodiments can be determined as follows.

Figure 6:
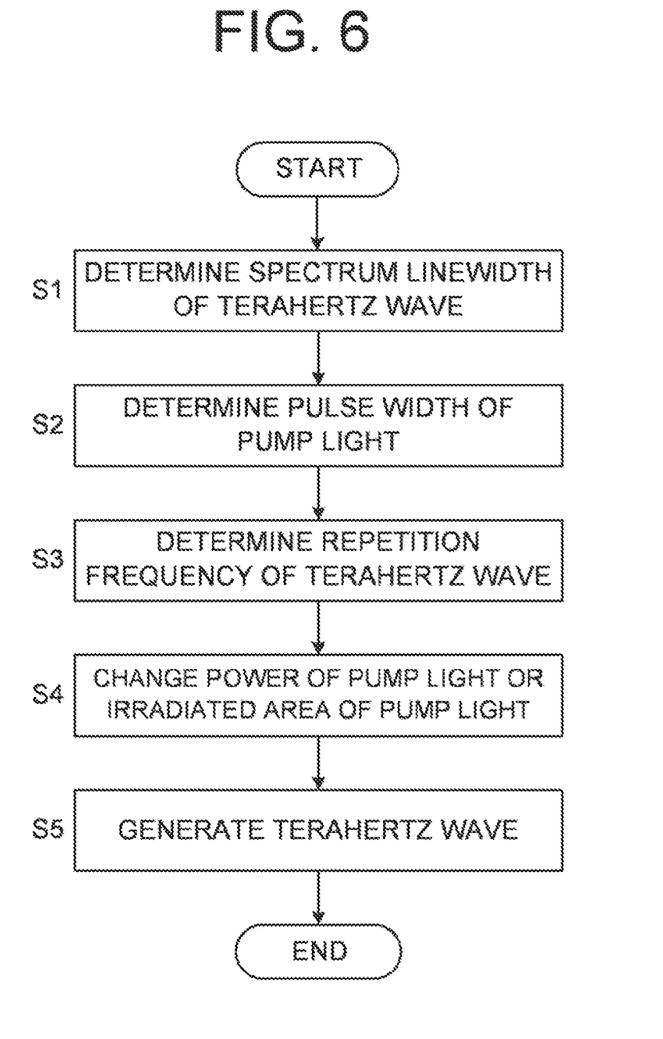
FIG. 6 is a schematic diagram for explaining a decision flow of the excitation conditions in the terahertz-wave generation apparatus according to the embodiments.

FIG. 6 shows a decision flow of the excitation conditions in the terahertz-wave generation apparatus 1 according to the embodiments.

(Step S1)
First, the spectrum linewidth of the terahertz wave to be generated is determined. For example, the spectral linewidth is determined in consideration of the atmospheric absorption spectrum in the terahertz wave region.

(Step S2)
When the spectrum linewidth is determined in step S1, the pulse width of the pump light is uniquely determined from the known Fourier limit equation.

(Step S3)
Next, the repetition frequency of the terahertz wave is determined. For example, the repetition frequency is determined in consideration of the performance of the pump light source 11 and the like.

(Step S4)
When the determination of the pulse width in step S2 and the determination of the repetition frequency in step S3 are completed, a controllable straight line is specified on the characteristic map in FIG. 5. Therefore, the power or irradiated area of the pump light is determined so as to be within the control range shown in FIG. 5.

(Step S5)
The controller 100 can control the optical system and the like according to the control content determined in step S4, thereby causing the pump light to be incident on the nonlinear optical crystal 71 under a desired excitation condition and generating a desired terahertz wave (END).

As described above, by focusing attention on two parameters of the peak excited power density and the average excited power density and appropriately selecting the repetition frequency and the pulse width of the pump light, a desired terahertz wave with high monochromaticity can be generated. In addition, an inexpensive light source can be employed as the pump light source.

In particular, a terahertz wave having a high repetition frequency can be generated. Therefore, even for a terahertz wave with low energy, the light receiving sensitivity can be improved by repeatedly receiving light with a light receiver. Thereby, a low-cost light receiver at room temperature can be employed.

The terahertz-wave generation method according to the embodiments generates a terahertz wave in a direction satisfying a non-collinear phase-matching condition by making pump light incident on a nonlinear optical crystal (71) capable of generating a terahertz wave by optical parametric effect. The terahertz generation method makes the pump light incident on the nonlinear optical crystal so that a peak excited power density is equal to or greater than a predetermined terahertz-wave lasing threshold (TH1) and equal to or less than a predetermined laser damage threshold (TH2), and an average excited power density is equal to or less than a predetermined photorefractive effect occurrence threshold (TH3). The pump light has a pulse width of 10 ps or more, the pulse width of 1 ns or less, and a repetition frequency of 1 kHz or more.

According to such a configuration, the terahertz wave having a high repetition frequency and high monochromaticity at room temperature can be generated reliably without thermal damage and non-thermal damage of nonlinear optical crystal.

Further, the terahertz-wave generation method according to the embodiments may change at least one of the peak excited power density and the average excited power density by changing power of the pump light.

According to such a configuration, the power of the pump light is changed. Thereby, the peak excited power density and the average excited power density can be changed with a simple control. As a result, optical damage of the nonlinear optical crystal can be surely avoided.

Further, the terahertz-wave generation method according to the embodiments may change at least one of the peak excited power density and the average excited power density by changing light flux diameter of the pump light at an incident surface of the nonlinear optical crystal.

According to such a configuration, the light flux diameter of the pump light at the incident surface of the nonlinear optical crystal can be changed. Thereby, the peak excited power density and the average excited power density can be changed with a simple control. As a result, optical damage of the nonlinear optical crystal can be surely avoided.

Further, in the terahertz-wave generation method according to the embodiments, the terahertz-wave lasing threshold may be 500 $MW/cm^2$.

Further, in the terahertz-wave generation method according to the embodiments, the nonlinear optical crystal may be magnesium-oxide doped lithium niobate crystal with congruent composition.

Further, in the terahertz-wave generation method according to the embodiments, the laser damage threshold may be 5.6 $GW/cm^2$.

Further, in the terahertz-wave generation method according to the embodiments, the photorefractive effect occurrence threshold may be 52 $kW/cm^2$.

According to any of the above-described configurations, a terahertz wave having a high repetition frequency and high monochromaticity at room temperature can be generated while reliably avoiding optical damage of the magnesium-oxide doped lithium niobate crystal with congruent composition.

Further, in the terahertz-wave generation method according to the embodiments, the nonlinear optical crystal may be lithium niobate crystal with stoichiometric composition.

Further, in the terahertz-wave generation method according to the embodiments, the laser damage threshold may be 14 $GW/cm^2$.

Further, in the terahertz-wave generation method according to the embodiments, the photorefractive effect occurrence threshold may be 2 $MW/cm^2$.

According to any of the above-described configurations, a terahertz wave having a high repetition frequency and high monochromaticity at room temperature can be generated while reliably avoiding optical damage of the magnesium-oxide doped lithium niobate crystal with stoichiometric composition.

Further, the terahertz-wave generation apparatus (1) includes a pump light source (11), a nonlinear optical crystal (71), a first optical system (pump light guide system 20, pump light amplification system 30), and a controller (100). The pump light source is configured to output pump light having a pulse width of 10 ps or more, the pulse width of 1 ns or less, and a repetition frequency of 1 kHz or more. The nonlinear optical crystal can generate a terahertz wave by the optical parametric effect. The first optical system is configured to guide the pump light output by the pump light source to the nonlinear optical crystal. The controller is configured to control at least one of the pump light source and the first optical system so that a peak excited power density is equal to or greater than a predetermined terahertz-wave lasing threshold (TH1) and equal to or less than a predetermined laser damage threshold (TH2), and an average excited power density is equal to or less than a predetermined photorefractive effect occurrence threshold (TH3). The terahertz-wave generation apparatus is configured to generate the terahertz wave in a direction satisfying a non-collinear phase-matching condition by making the pump light incident on the nonlinear optical crystal.

According to such a configuration, the terahertz-wave generation apparatus capable of reliably generating the terahertz wave having a high repetition frequency and high monochromaticity at room temperature can be provided without thermal damage and non-thermal damage of nonlinear optical crystal.

Further, in the terahertz-wave generation apparatus according to the embodiments, the controller is configured to control at least one of the peak excited power density and the average excited power density by controlling the pump light source to change power of the pump light.

According to such a configuration, the power of the pump light is changed. Thereby, the peak excited power density and the average excited power density can be changed with a simple control. As a result, optical damage of the nonlinear optical crystal can be surely avoided.

Further, in the terahertz-wave generation apparatus according to the embodiments, the first optical system includes a pump light amplification system (30) configured to amplify the pump light, and the controller is configured to control at least one of the peak excited power density and the average excited power density by changing an amplification factor of the pump light amplified by the pump light amplification system.

According to such a configuration, the amplification factor of the pump light is changed. Thereby, the peak excited power density and the average excited power density can be changed with a simple control. As a result, optical damage of the nonlinear optical crystal can be surely avoided.

Further, in terahertz-wave generation apparatus according to the embodiments, the first optical system includes a lens system (23) capable of changing a focal position, and the controller is configured to control at least one of the peak excited power density and the average excited power density by controlling the lens system.

According to such a configuration, the light flux diameter of the pump light at the incident surface of the nonlinear optical crystal. Thereby, the peak excited power density and the average excited power density can be changed with a simple control. As a result, optical damage of the nonlinear optical crystal can be surely avoided.

Further, the terahertz-wave generation apparatus according to the embodiments may include a second optical system (seed light generation system 50) configured to inject seed light in a generation direction of idler light generated by making the pump light incident on the nonlinear optical crystal, wherein the controller is configured to control at least one of the peak excited power density and the average excited power density by change power of the seed light.

According to such a configuration, the power of the seed light is changed. Thereby, the peak excited power density and the average excited power density can be changed with a simple control. As a result, optical damage of the nonlinear optical crystal can be surely avoided.

Further, in the terahertz-wave generation apparatus according to the embodiments, the terahertz-wave lasing threshold may be 500 $MW/cm^2$.

Further, in the terahertz-wave generation apparatus according to the embodiments, the nonlinear optical crystal may be magnesium-oxide doped lithium niobate crystal with congruent composition.

Further, in the terahertz-wave generation apparatus according to the embodiments, the laser damage threshold may be 5.6 $GW/cm^2$.

Further, in the terahertz-wave generation apparatus according to the embodiments, the photorefractive effect occurrence threshold may be 52 $kW/cm^2$.

According to any of the above-described configurations, a terahertz wave having a high repetition frequency and high monochromaticity at room temperature can be generated while reliably avoiding optical damage of the magnesium-oxide doped lithium niobate crystal with congruent composition.

Further, in the terahertz-wave generation apparatus according to the embodiments, the nonlinear optical crystal may be lithium niobate crystal with stoichiometric composition.

Further, in the terahertz-wave generation apparatus according to the embodiments, the laser damage threshold may be 14 $GW/cm^2$.

Further, in the terahertz-wave generation apparatus according to the embodiments, the photorefractive effect occurrence threshold may be 2 $MW/cm^2$.

According to any of the above-described configurations, a terahertz wave having a high repetition frequency and high monochromaticity at room temperature can be generated while reliably avoiding optical damage of the magnesium-oxide doped lithium niobate crystal with stoichiometric composition.

The above-described embodiments are merely examples for carrying out the present invention. Those who intend to implement the present invention can apply any modification, omission, addition, or the like within the scope of the gist of the present invention.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A terahertz-wave generation method of generating a terahertz wave in a direction satisfying a non-collinear phase-matching condition by making pump light incident on a nonlinear optical crystal capable of generating a terahertz wave by optical parametric effect, the method comprising:
making the pump light incident on the nonlinear optical crystal so that a peak excited power density is equal to or greater than a predetermined terahertz-wave lasing threshold and equal to or less than a predetermined laser damage threshold, and an average excited power density is equal to or less than a predetermined photorefractive effect occurrence threshold, the pump light having a pulse width of 10 ps or more, the pulse width of 1 ns or less, and a repetition frequency of 1 kHz or more.

2. The terahertz-wave generation method of claim 1, wherein
at least one of the peak excited power density and the average excited power density is changed by changing power of the pump light.

3. The terahertz-wave generation method of claim 1, wherein
at least one of the peak excited power density and the average excited power density is changed by changing light flux diameter of the pump light at an incident surface of the nonlinear optical crystal.

4. The terahertz-wave generation method of claim 1, wherein
the terahertz-wave lasing threshold is 500 MW/cm$^2$.

5. The terahertz-wave generation method of claim 1, wherein
the nonlinear optical crystal is magnesium-oxide doped lithium niobate crystal with congruent composition.

6. The terahertz-wave generation method of claim 5, wherein
the laser damage threshold is 5.6 GW/cm$^2$.

7. The terahertz-wave generation method of claim 5, wherein
the photorefractive effect occurrence threshold is 52 kW/cm$^2$.

8. The terahertz-wave generation method of claim 1, wherein
the nonlinear optical crystal is lithium niobate crystal with stoichiometric composition.

9. The terahertz-wave generation method of claim 8, wherein
the laser damage threshold is 14 GW/cm$^2$.

10. The terahertz-wave generation method of claim 8, wherein
the photorefractive effect occurrence threshold is 2 MW/cm$^2$.

11. A terahertz-wave generation apparatus, comprising:
a pump light source configured to output pump light having a pulse width of 10 ps or more, the pulse width of 1 ns or less, and a repetition frequency of 1 kHz or more;
a nonlinear optical crystal capable of generating a terahertz wave by optical parametric effect;
a first optical system configured to guide the pump light output by the pump light source to the nonlinear optical crystal; and
a controller configured to control at least one of the pump light source and the first optical system so that a peak excited power density is equal to or greater than a predetermined terahertz-wave lasing threshold and equal to or less than a predetermined laser damage threshold, and an average excited power density is equal to or less than a predetermined photorefractive effect occurrence threshold, wherein
the terahertz-wave generation apparatus is configured to generate the terahertz wave in a direction satisfying a non-collinear phase-matching condition by making the pump light incident on the nonlinear optical crystal.

12. The terahertz-wave generation apparatus of claim 11, wherein
the controller is configured to control at least one of the peak excited power density and the average excited power density by controlling the pump light source to change power of the pump light.

13. The terahertz-wave generation apparatus of claim 11, wherein
the first optical system includes a pump light amplification system configured to amplify the pump light, and
the controller is configured to control at least one of the peak excited power density and the average excited power density by changing an amplification factor of the pump light amplified by the pump light amplification system.

14. The terahertz-wave generation apparatus of claim 11, wherein
the first optical system includes a lens system capable of changing a focal position, and
the controller is configured to control at least one of the peak excited power density and the average excited power density by controlling the lens system.

15. The terahertz-wave generation apparatus of claim 11, further comprising
a second optical system configured to inject seed light in a generation direction of idler light generated by making the pump light incident on the nonlinear optical crystal, wherein
the controller is configured to control at least one of the peak excited power density and the average excited power density by change power of the seed light.

16. The terahertz-wave generation apparatus of claim 11, wherein
the terahertz-wave lasing threshold is 500 MW/cm$^2$.

17. The terahertz-wave generation apparatus of claim 11, wherein
the nonlinear optical crystal is magnesium-oxide doped lithium niobate crystal with congruent composition.

18. The terahertz-wave generation apparatus of claim 17, wherein
the laser damage threshold is 5.6 GW/cm$^2$.

19. The terahertz-wave generation apparatus of claim 17, wherein
the photorefractive effect occurrence threshold is 52 kW/cm$^2$.

20. The terahertz-wave generation apparatus of claim 11, wherein
the nonlinear optical crystal is lithium niobate crystal with stoichiometric composition.

21. The terahertz-wave generation apparatus of claim 20, wherein
the laser damage threshold is 14 GW/cm$^2$.

22. The terahertz-wave generation device of claim 20, wherein
the photorefractive effect occurrence threshold is 2 MW/cm$^2$.

* * * * *